(12) United States Patent
Maloney

(10) Patent No.: US 6,299,971 B1
(45) Date of Patent: *Oct. 9, 2001

(54) CERAMIC COATINGS CONTAINING LAYERED POROSITY

(75) Inventor: Michael J. Maloney, Port St. Lucie, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/460,819

(22) Filed: Dec. 14, 1999

Related U.S. Application Data

(62) Division of application No. 08/972,589, filed on Nov. 18, 1997.

(51) Int. Cl.$^7$ .............................. B32B 3/26; C23C 16/00
(52) U.S. Cl. ..................... 428/312.8; 428/316.6; 428/212; 427/373; 427/255.19; 427/255.21; 427/255.7
(58) Field of Search ................... 428/212, 312.2, 428/312.8, 316.6, 318.4, 318.6, 319.1, 469, 701, 702, 623, 633; 427/372.2, 373, 255.11, 255.19, 255.21, 255.7; 416/241 R, 241 B

(56) References Cited

U.S. PATENT DOCUMENTS

| | | | |
|---|---|---|---|
| 3,975,165 | * | 8/1976 | Elbert et al. ........................ 29/182.2 |
| 4,336,276 | * | 6/1982 | Bill et al. .............................. 427/34 |
| 4,566,700 | * | 1/1986 | Shiembob ............................. 277/53 |
| 4,936,745 | * | 6/1990 | Vine et al. ......................... 415/173.4 |
| 5,015,502 | * | 5/1991 | Strangman et al. ................. 427/248 |
| 5,059,095 | * | 10/1991 | Kushner et al. ................. 416/241 B |
| 5,384,200 | * | 1/1995 | Giles .................................... 428/552 |
| 5,817,372 | * | 10/1998 | Zheng ................................. 427/456 |
| 5,834,108 | * | 11/1998 | Shimai et al. .................... 428/307.3 |
| 6,957,047 | * | 2/2000 | Maloney ............................. 428/623 |

OTHER PUBLICATIONS

Growth and Growth–Related Properties . . . Donald M. Mattox, ASM Handbook, vol. 5, 1994, 18 pgs.

Study of the Structure and Properties of Thick Vacuum . . . Movchan, Demchishin, Phys. Met. Metallogr. (USSR), vol. 28, 1969, 9 pgs.

Physical Vapor Deposition of Ceramic Coatings for Gas Turbine Engine Components, Demaray, Fairbanks, Boone, 8 pgs.

High Rate Thick Film Growth, John A. Thornton, Ann Rev. Mater Sci. 1977: 239–60, 12 pgs.

* cited by examiner

Primary Examiner—Deborah Jones
Assistant Examiner—Stephen Stein
(74) Attorney, Agent, or Firm—Charles E. Sohl

(57) ABSTRACT

Layered ceramic coatings in which some layers contain porosity as described as are methods for producing such coatings. The different layers have different compositions and/or are applied under different conditions. As applied, some of the layers have a Zone I structure and some have a Zone II/III type structure (as defined by Movchan). Heat treatment can be used to increase the porosity in the Zone I structure layers.

15 Claims, 4 Drawing Sheets

CERAMIC COATINGS CONTAINING LAYERED POROSITY

This is a division of copending continuing application Ser. No. 08/972,589 filed on Nov. 18, 1997.

FIELD OF THE INVENTION

This invention relates to the field of ceramic thermal barrier coatings and to abradable ceramics for use in gas turbine seal applications. More specifically this invention relates to ceramic thermal barrier coatings and abradable seals comprised of multiple layers in which at least one of the layers is porous.

DESCRIPTION OF RELATED ART

Gas turbine engines are widely used as sources of motive power, and for other purposes such as electric generation and fluid pumping. Gas turbine manufacturers face a constant customer demand for better performance, enhanced efficiency and improved life. One way to improve performance efficiency and performance is to increase operating temperatures. Increasing operating temperatures usually reduces engine life and is effective only within the limits of materials used in the engine.

Current gas turbine engines are predominantly constructed of metallic materials, with nickel base superalloys being widely used in high temperature portions of the engine. Such superalloys are currently used in engines where with gas temperatures which are very near their melting point of the superalloys. Increases in engine operating temperature are not possible without concurrent steps to protect the superalloys from direct exposure to gas temperatures at which melting occurs. Such steps include the provision of cooling air (which reduces engine efficiency) and the use of insulating coatings.

Insulating ceramic materials, particularly in the form of coatings or thermal barrier coatings, are the primary subject of this invention. Such coatings are most commonly ceramic and are commonly applied by plasma spraying or by electron beam vapor deposition. This invention focuses on coatings applied by electron beam vapor deposition. The electron beam vapor deposition process is described in U.S. Pat. Nos. 4,405,659; 4,676,994 and 5,087,477. Typical patents which discuss the current state of the art thermal barrier coatings are as follows: U.S. Pat. Nos. 4,405,660; 5,262,245 and 5,514,482.

The most widely used thermal barrier coating for application to rotating components in turbine engines comprises a bond coat material whose composition is described in U.S. Pat. No. 4,419,416, a thin layer of aluminum oxide on said bond coat, and a columnar grain ceramic coating adhered to the aluminum oxide layer as described in U.S. Pat. No. 4,405,659. This coating was developed by the assignee of the present invention and it is currently applied to more than 100,000 gas turbine components per year. Despite the success of this coating and its widespread acceptance there is a desire for advanced thermal barrier coatings, the principle desired enhancement being improved specific thermal insulation properties (thermal insulation corrected for density).

If a coating with improved density corrected insulation properties could be developed, such a coating could either be used at the same thickness as that now used commercially to reduce heat flow (allowing for a reduction in cooling air and thereby increasing engine efficiency) or could be used at a reduced thickness to provide the same degree of insulation and heat flow but with reduced coating weight. Such weight reductions are significant, especially on rotating components, since the weight of the thermal barrier coating results in centrifugal forces during engine operation of as much as two thousand pounds on a single turbine blade in a large aircraft engine. Reducing blade centrifugal forces has positive implications in the design requirements of engine components associated with the blade, in particular the supporting disc.

Gas turbine efficiency can also be improved by reducing gas leakage. In particular the clearance between the tips of the rotating blade and the surrounding case structure must be minimized. This is commonly accomplished by providing an abradable seal material on the case. In operation the blade tips cut a channel in the abradable, thus reducing gas leakage. The contents of U.S. Pat. Nos. 4,039,296 and 5,536,022 are incorporated herein by reference.

SUMMARY OF THE INVENTION

The present invention comprises a layered ceramic material, preferably applied as a coating. Different layers in the structure have different microstructures, with at least one of the layers being relatively dense and another of the layers being less dense and defective. The structure of the less dense defective layer can be modified by heat treatment to provide porosity. Porosity provides reduced thermal conductivity and increased abradability.

The layers are preferably deposited by electron beam physical vapor deposition. Sputtering is an alternative application technique for the invention process, but as currently practiced is a slow and generally uneconomic process.

Most frequently the layers will have different chemical compositions although under certain circumstances it is possible for the layers to have a common chemical composition. The layers are applied under conditions which produce the previously mentioned differences in density and porosity between alternating layers.

The relatively dense layers are applied by electron beam vapor deposition under conditions which result in the deposition of what those knowledgeable in the physical vapor deposition art refer to as zone II or zone III structures hereinafter the designation Zone II/III will be used to refer to structures having either a Zone II or Zone III type structure or a combination of Zone II and Zone III structures. The less dense layers (i.e. the layers which will become porous) are applied under conditions which result in microstructures that those skilled in the physical vapor deposition art referred to as Zone I structures. As used herein, the term Zone I means a layer having either an as deposited Zone I structure or an as deposited Zone I structure which has been heat treated to enhance porosity.

Preferably the resultant structure will be heat treated to enhance porosity through sintering which increases pore size and densifies the ceramic portions which surround the pores.

The invention coating finds particular application in the field of gas turbine components. Such components include turbine airfoils (blades and vanes) and abradable seals which are intended to interact with blade tips or knife edge seals to reduce unwanted gas flow.

DESCRIPTION OF PREFERRED EMBODIMENTS

Figure 1:
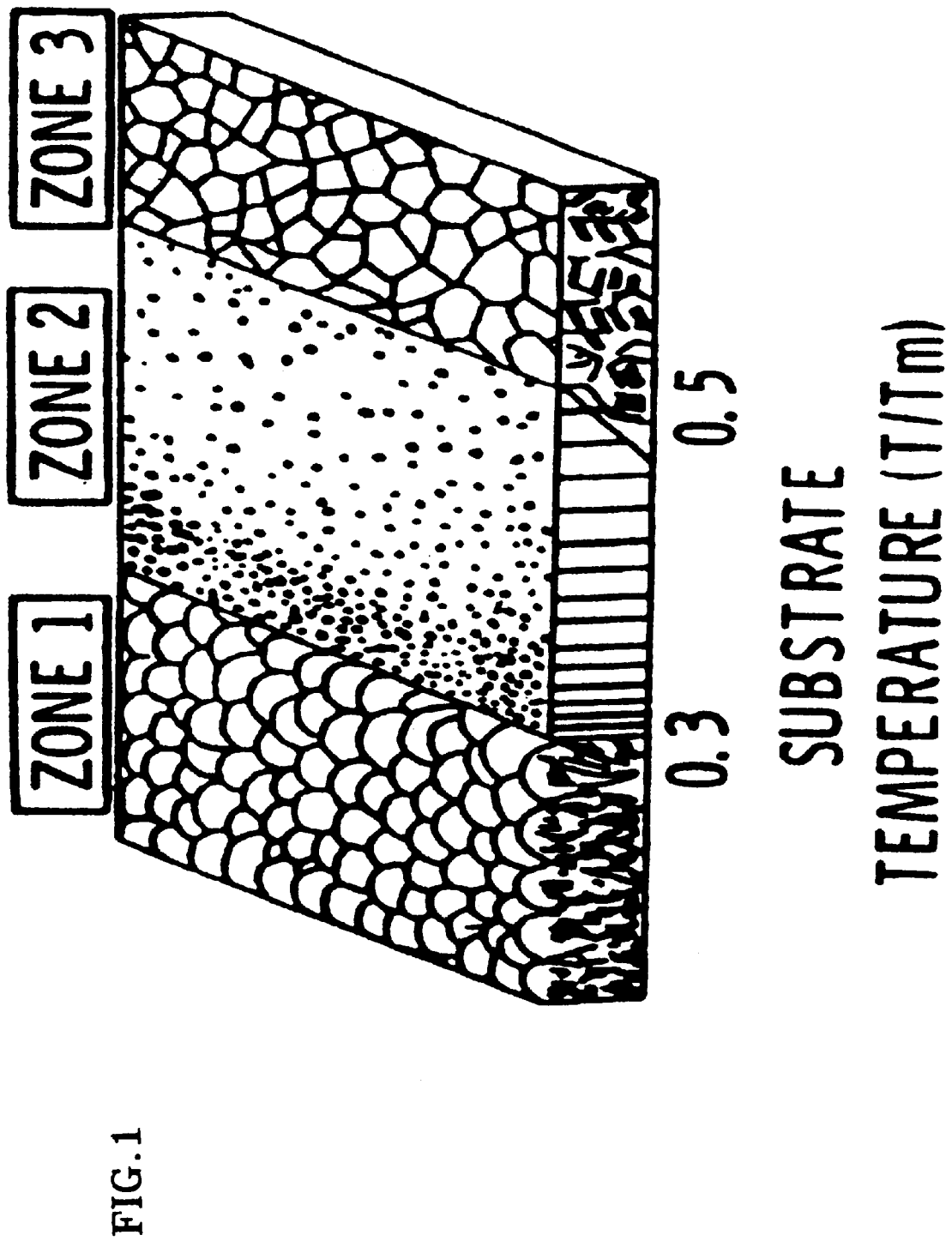
FIG. 1 shows the structure of EBPVD deposited coatings as a function of substrate surface temperature

Physical vapor deposition of ceramics, including electron beam and sputtering techniques, has been widely studied. A paper published by B. A. Movchan and A. B. Demchishin entitled "Study of the Structure and Properties of Thick Vacuum Condensates of Nickel, Titanium, Tungsten, Aluminum oxide, and Zirconium oxide" in 1969 the Journal Physics of Metallurgy and Metallography (USSR), volume 28 page 83, analyses the vapor deposition of materials under different conditions. These authors were the first to characterize the structure of electron beam physical vapor deposited coatings as a function of substrate surface temperature. FIG. 1 from their paper is reproduced as FIG. 1 herein. In 1974 Thornton published a similar paper related to sputter deposition, J. Vac. Sci, Technol. 11:666.70, (1974) with similar conclusions.

FIG. 1 shows the three zones which occur in physical vapor deposited coatings as a function of substrate surface temperature during deposition. Zone I is a low density coating with an extremely large defect content (micropores, microvoids, dislocations, vacancies and the like). Zone II is a more dense columnar grain structure where in each column, and is a single grain and zone III is a yet more dense (essentially fully dense) coating comprised of equiaxed recrystallized grains. It is believed that the change in deposit character (effectively increasing in density with increasing substrate temperature) results from the enhanced mobility of vapor deposited atoms after they strike the substrate surface.

For ceramics, Movchan et al determined that the boundary between zone I and zone II typically occurred at a homologous temperature (homologous temperature refers to the fraction of the absolute melting temperature of the material) of between 0.22 and 0.26 and the boundary between zones II and III typically occurred at a homologous temperature of between about 0.45 and 0.5.

It can be seen that a single ceramic composition can be deposited so as to have three different structures by controlling the temperature of the substrate surface on which the coating is being deposited. Since deposited coating microstructure is a function of the substrate temperature it can also be seen that different ceramic materials with different melting points and therefore different homologous temperatures might be deposited on a substrate at constant surface temperature and exhibit different zone structures.

The substrate surface temperature refers to the temperature at the surface on which the coating is deposited, this temperature often differs from the bulk substrate temperature and is affected by radiant energy flux and the energy input into the surface by coating material which strikes the surface. Higher substrate surface temperatures permit lateral diffusion of deposited atoms which results in higher density deposits.

The essence of the present invention is the deposition of at least one layer having a zone I structure and at least one layer having a Zone II or Zone III structure (followed by appropriate heat treatment; a guideline for appropriate heat treatment temperature would be a temperature in excess of about 0.5–0.8 of the homologous temperature of the layer composition in which porosity is to be formed). Preferably the Zone I layer is located between adjacent layers of Zone II/III structures. The Zone I structure, being less dense, will inhibit heat flow and thereby provide thermal insulation, the less dense structure will also be more abradable for seal applications. The relatively denser Zone I/III structure layer will provide mechanical strength. Layer thickness will vary between 0.05 and 5000 microns and preferably between 0.1 and 1000 microns. Total coating thickness may range from about 10 microns to about 1 mm for thermal barrier coatings, and up to about 5mm for abradable coatings.

Most practical applications of the invention will contain many alternating layers of materials, more than 10 layers and most preferably more than 100 layers.

Practical applications of the invention will preferably also employ heat treatments after the deposition of the layer coating to cause sintering of the Zone I structure and the formation of large agglomerated pores or porosity. Such pore agglomeration enhances the mechanical properties of the coating by densifying the ceramic in regions between the pores. Average pore size exceeds 0.01 and preferably 0.1 micron. The resultant pores have a rounded shape characterized in that for a pore of average diameter "D" (measured on multiple diameters), the smallest radius of the pore wall will be greater than 0.1D and preferably greater than 0.3D.

This relatively smooth rounded geometry distinguishes the pores found in the invention coating from the voids found in plasma sprayed coatings. Plasma sprayed coatings are formed by the impact or splatting of molten or softened powder particles. The resultant coating has irregular, sharp cornered pores between the solidified splats. Also, plasma spray porosity is not found in layers separated by layers which are essentially porosity free.

After heat treatment the porous Zone I layer will contain more substantially than about 20% porosity by volume and most preferably more than about 35% porosity by volume. The Zone II/Zone III layers will contain less than about 5% by volume and preferably less than about 2% porosity by volume. Substantially free from porosity means less than about 5% by volume, and preferably less than about 2% by volume.

In its broadest definition, the invention comprises at least one Zone I layer (whether as deposited or after being heat treated to enhance porosity) and at least one Zone II/Zone III layer. Preferably there are at least 10 layers with at least 3 being of the Zone I and at least 3 being of the Zone II and or Zone III type. Preferably there are more than 100 layers in the coating with at least 10 layers being of the Zone I type and at least 10 being of the Zone II or Zone III structure.

A bond coat will usually be positioned between the substrate and the invention layered porosity coating. Preferred bond coats include those coatings known as MCrAlY coatings and aluminide coatings. Both types of coatings form dense, adherent alumina layers of reasonable purity and it is this alumina layer to which the invention coating adheres.

The concept of this invention may be better understood through consideration of the following example which is meant to be illustrative rather than limiting.

EXAMPLE

A single crystal superalloy substrate having a nominal composition of 5% Cr, 10% Co, 1.9% Mo, 5.9% W, 3% R, 8.7% Ta, 5.65% Al, 0.1% $H_f$, Bal Ni was provided. The surface of the substrate was cleaned by grit blasting and then a thin (nominal 0.005 in thick) MCrAlY type bond coat layer having a nominal composition of (22% C, 17% Cr, 12.5% Al, 0.25% $H_f$, 0.4% Si, 0.6% Y, Bal Ni was applied). The bond coat was deposited by conventional plasma spray techniques. The bond coat surface was then glass bead peened to enhance its density. A heat treatment step was then performed to develop a thermally grown oxide layer (predominantly alumina). The treatment was performed at 1500° F. for 15 minutes at an oxygen flow of 70 sccm at a pressure of about $10^{-4}$ torr. Minimal experimentation will be required to develop the desired oxide thickness of 0.01–2.0 micron and preferably 0.1–0.7 micron.

A layered coating consisting of alternating layers of ceria containing 12 weight percent yttria, and zirconia stabilized with 7 weight percent yttria was then applied on the bond coat surface. Coating thicknesses were about 0.5 microns for the stabilized zirconia and about 0.5 microns for the yttria-ceria. About 300 pairs of coating layers were applied for total coating thickness of about 300 microns.

These coating layers were applied using an electron beam to evaporate particulate starting ceramic materials. The electron beam was deflected to alternately evaporate the different constituent ceramics. The particulate sources were evaporated by an electron beam operating at about 10 kilovolts and a current of about 0.4 amps for an evaporation power of about 4 KW. The dwell time of the electron beam on the yttria-ceria was about 4 seconds and on the yttria-zirconia about 6 seconds. The standoff distance from the substrate to the ceramic vapor source was about 3 inches. The substrate was rotated about 28 revolutions per minute and the bulk substrate temperature was about 1400° F. The coatings were applied at a reduced pressure of about $4 \times 10^{-6}$ torr and oxygen was flowed into the chamber at a rate of about 70 standard cubic centimeters per minute to ensure coating stoichiometry. The total time to apply this coating was about 60 minutes.

During coating deposition the coating source heated the substrate surface to a greater degree during the yttria-zirconia deposition than during the yttria-ceria deposition. This process resulted in the yttria-zirconia layers having a dense Zone II structure while the yttria-ceria formed a highly defective, Zone I structure containing microvoids and microporosity. The estimated porosity of the yttria-zirconia was less than about 5%. Thermal radiation from the evaporating target material was the primary source for substrate surface heating (above the bulk substrate temperature) during the electron beam physical vaporization coating process.

The enhanced heating of the substrate surface during the deposition of the yttria-zirconia layers resulted from the high temperature of the yttria-zirconia target material during evaporation. During the coating process significantly more heat was generated from the yttria-zirconia during evaporation, because this material has a relatively low vapor pressure, so that the yttria-zirconia material must be heated to a high temperature, and melted, in order to vaporize material at a reasonable rate. The yttria-ceria composition has a much higher vapor pressure and vaporizes readily at a much lower temperature, apparently by sublimation, and so does not form a hot molten pool such as that formed during true evaporation. The yttria-ceria target material, being at a lower temperature, and not forming a molten pool during evaporation than the yttria-zirconia, heats the substrate less effectively.

In summary, the substrate surface being coated was at a relatively high temperature during deposition of yttria-zirconia due to the effective heating by the yttria-zirconia target source, and resultant vapor cloud, and the yttria-zirconia vapor condensed as a Zone II type structure. However, the substrate surface was at a relatively low temperature during deposition of yttria-ceria due to limited heating by the yttria-ceria target source, and the ceria vapor cloud, producing a Zone I type structure.

Figure 2:
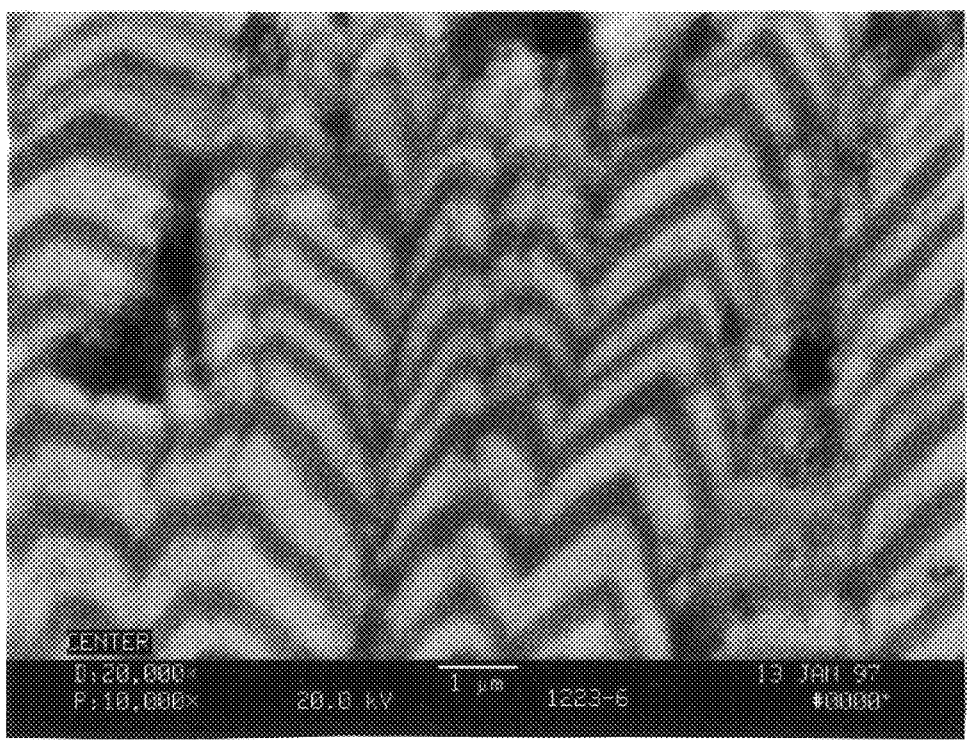
FIG. 2 shows the microstructure of the as deposited Example coating as deposited.
Figure 3:
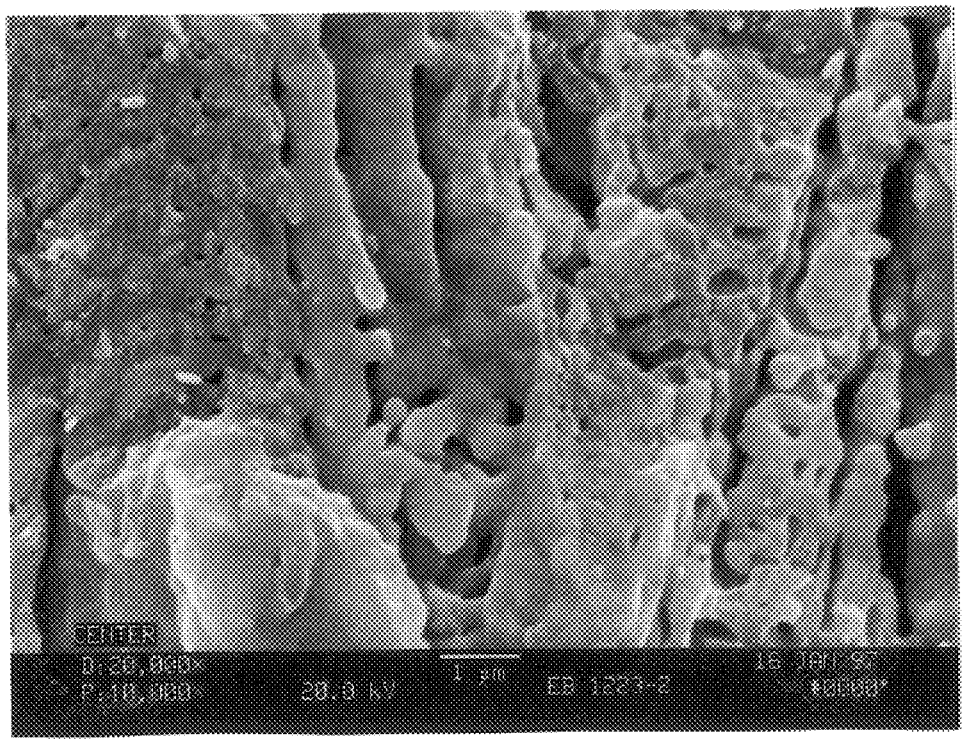
FIG. 3 shows the microstructure of the Example coating after heat treatment.

The microstructure of the as deposited coating is shown in FIG. 2. The dark bands in the coating are the defective yttria-ceria layers and the light bands are the stabilized zirconia layers. After deposition the coating was heat treated at 2200° F. for a period of 48 hours and the microstructure of the heat treated coating is shown in FIG. 3. It can be seen that a high degree of porosity is present. Porosity is present in the layers that were originally yttria-ceria (Zone I type structure). There is no visible porosity in the yttria stabilized zirconia layers.

Figure 4:
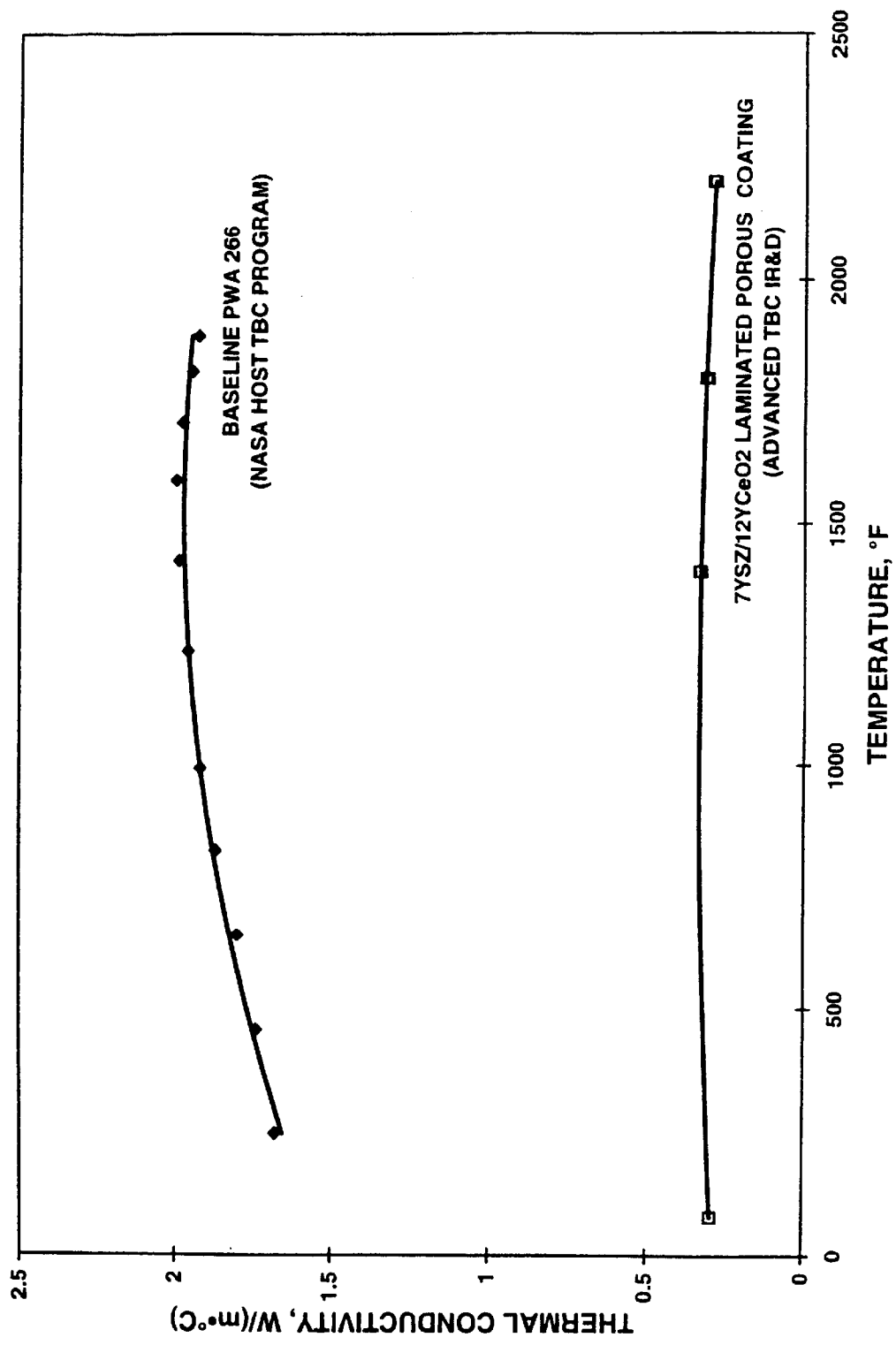
FIG. 4 shows the thermal conductivity of the Example coating and 7% yttria stabilized zirconia.

FIG. 4 is a plot of the thermal conductivity of the invention coating as described in this example and the prior art yttria stabilized zirconia coating described in U.S. Pat. No. 4,405,659. It can be seen that over a wide range of temperatures the thermal conductivity of the invention coating is substantially less than that of the prior art coating. Over most of the temperature range the coating of the present invention displays a thermal conductivity which is about 80% less than that of the prior art coating. This is a significant enhancement in insulation capability.

The previous example has illustrated the invention using one combination of ceramic material. There are of course many combinations of ceramic materials which can be deposited.

Some variations and alternate details are described below.

I. Substrate

Most broadly the substrate may comprise any high temperature material such as, for example, ceramics, carbon, carbon composites and the like as well as superalloys. For the assignee's current purposes, superalloys are most useful. Superalloys are metallic materials, based on iron, nickel or cobalt having yield strengths in excess of 50 ksi and more typically in excess of 100 ksi at 1,000° F.

As discussed below, bond coats are often desired to ensure coating adherence to the substrate, however, under some conditions, for some superalloys there may not be a need for a bond coat. Superalloys which can be coated without the necessity of a bond coat are those which inherently develop a layer of high purity aluminum on their outer surfaces upon exposure to oxidizing conditions at elevated temperatures. Typical superalloys which do not require a bond coat are described in U.S. Pat. No. 5,262,245.

If the invention coating were to be applied to a ceramic material, for example, alumina, there would generally not be a need for a bond coat.

II. Bond Coat

Most commonly a bond coat will be a part of the invention coating system. The requirement for a bond coat will depend on the substrate and on the requirements for thermal barrier coating performance, operating temperature, desired life and other environmental factors including thermal cycling and the environmental gas composition. There are a variety of bond coats which can be used with the present invention. These include overlay coating and aluminide coatings. Typical overlay coatings are described in U.S. Pat. Nos. 3,928,026 and 4,419,416 and are variations on nickel and cobalt base superalloys that have been optimized to develop adherent durable high purity alumina layers upon exposure to oxidizing conditions at elevated temperatures.

Overlay coatings, are applied to the surface of the substrate and are typified by the MCrAlY type coatings which have the following general composition.

| | |
|---|---|
| M = Fe, Ni, Co and(Ni + Co) | = Bal |
| Cr = | = 10–30% |
| Al = | = 5–15% |
| Y = (Y + Hf + La + Ce + Sc) | = .01–1% |
| (Si + Ta + Pt + Pd + Re + Rh + Os) | = 0–5% |

Overlay coatings can be applied by plasma spraying, by EBPVD and by electroplating.

Aluminide coatings are produced by diffusing aluminum into the substrate and are described in U.S. Pat. No. 5,514,482 which is incorporated by reference. As used herein the term aluminide coating includes aluminide coatings modified by additions of Pt, Rh, Os, Pd, Ta, Re, $H_f$, Si, Cr and mixtures thereof It is also known to apply combinations of overlay and aluminide coatings, for example an aluminide coating can have an overlay coating applied thereover, and vice versa.

The essential common features required of a useful bond coat are that it be adherent to the substrate, be thermally and diffusionally stable, that it form a stable alumina layer which is adherent to the ceramic layer to be deposited in the operating environment.

IV. Ceramic Compositions

Virtually any ceramic composition that can be applied by physical vapor deposition can be used in the present invention. Obviously the ceramic will be judiciously chosen by the skilled artisan to be compatible with the bond coat and/or the substrate, the other ceramic compositions present in the coating, and the operating environment. The ceramic coating may comprise a single ceramic composition or different ceramic compositions applied as alternating layers. The critical feature is that the coating be processed to produce alternating Zone I/Zone II or Zone III layer structures. According to the work of Movchan et al and Thornton, any ceramic can apparently be applied with Zone I, Zone II or Zone III structures if the appropriate substrate surface temperatures are maintained. Preferably, the ceramics utilized are those which exhibit intrinsically low bulk thermal conductivity. These include stabilized zirconia, ceria with rare earth additions, and oxide pyrochlore compounds.

We prefer to use a sublimating ceramic to form the Zone I layers and an evaporating type ceramic to form the Zone II/III layers. This was illustrated in the Example.

The arrangement of the ceramic coating can be quite varied. The broadest description is that the coating consists of multiple layers, at least one of which is deposited to have a Zone I type structure.

Preferably the Zone I structure is subsequently heat treated to form porosity. Also, the Zone I structure layer preferably has Zone II and/or Zone III structure layers immediately adjoining it to provide mechanical support and constraint.

Preferably there are a plurality of Zone I type layers deposited separated by layers having Zone II/Zone III type structures.

We believe that fine porosity will be most effective in reducing heat flow. This must be balanced against the idea that small pores are less stable since they tend to shrink and close up or heal at high temperatures. Pore closure will not be a significant problem if the use temperature is less than the pore shrinkage temperature.

Preferably the layer adjacent the bond coat or substrate has a Zone II/Zone III type structure. Preferably the outermost layer also has a Zone II/Zone III type structure.

In some circumstances other layers may be incorporated without detracting from the thermal insulating benefits of the invention. For example an outer layer may be selected to provide particular properties desired for particular applications, such as thermal emissivity, hardness, abrasion resistance, resistance to environmental attack (oxidation, sulfidation, nitridation etc.) and/or resistance to diffusion of adverse environmental species such as oxygen which would adversely affect the underlying coating layer and/or the bond coat and/or the substrate. For example alumina might be desired as an outer layer because it is relatively hard and is resistant to the diffusion of oxygen.

For seal applications many of the same considerations apply. Total coating thickness will generally be greater, up to about 100 mils, preferably 50 mils. Individual layer thickness and pore volume and pore size will be optimized to provide the mechanical properties required for abradability.

V. Alumina Layer

An alumina layer, whether formed directly on the substrate or on a bond coat is an important invention feature. Most commonly the alumina layer will be thermally grown, but it is known to use sputtering to develop this layer. The broad thickness of the alumina layer is 0.01–2 microns, preferably 0.1–0.7 microns.

What is claimed is:

1. A porous ceramic material comprised of more than 10 ceramic layers wherein at least one of said layers contains at least about 20% by vol. porosity and at least one other layer contains less than about 5% by vol. porosity.

2. A material as in claim 1 in which the number of porous layers is greater than 3.

3. A method of applying a layered ceramic coating, wherein at least some of the layers are porous, to a substrate including the steps of
   a. vapor depositing a plurality of ceramic layers onto said substrate under conditions which result in at least one of said layers having a Zone I microstructure and at least one of said layers having a microstructure selected from the group consisting of Zone II and Zone III microstructures and mixtures thereof
   b. heat treating said plurality layer coated substrate to produce porosity in said at least one Zone I microstructure layer.

4. A method as in claims 3 wherein said substrate has a surface layer comprised primarily of alumina.

5. A method as in claim 4 wherein said alumina layer has a thickness of 0.1–2.0 microns.

6. A method as in claim 5 wherein said substrate has a bond coat selected from the group consisting of MCrAlY and aluminide layers and combinations thereof and said alumina layer is located on the surface of the bond coat.

7. A method as in claim 3 where the Zone I layers and the layers having a microstructure selected from the group consisting of Zone II and Zone III microstructures, and mixtures thereof have thicknesses of from about 0.05 to 5000 microns.

8. A method as in claim 3 in which said Zone I structure forming ceramic is vaporized under conditions of sublimation.

9. A method as in claim 3 wherein said Zone I ceramic structure layer is applied by sublimation and said layers having a microstructure selected from the group consisting of Zone II and Zone III microstructures, and mixtures thereof are applied by evaporation.

10. A method as in claim 3 wherein there are at least three layers having a Zone I structure.

11. A method as in claim 3 wherein there are at least 10 layers having a Zone I structure.

12. A method as in claim 3 wherein the total thickness of the Zone I layers and the layers having a microstructure selected from the group consisting of Zone II and Zone III microstructures, and mixtures thereof is from about 0.05 to 5000 microns.

13. The product made by the method of claims 3, 4, 5, 6, 7, 8, 9, 10, 11 or 12.

14. A porous ceramic material comprised of at least 11 ceramic layers wherein at least one of said layers contains at least about 20% by vol. porosity and at least one other layer contains less than about 5% by vol. porosity.

15. A porous ceramic material comprised of multiple ceramic layers wherein at least four of said layers contains at least 20% by vol. porosity and at least one other layer contains less than about 5% by vol. porosity.

* * * * *